(12) United States Patent
Alm et al.

(10) Patent No.: US 7,438,508 B2
(45) Date of Patent: Oct. 21, 2008

(54) CUTTING INSERT

(75) Inventors: Per Alm, Fagersta (SE); Anders Wickman, Fagersta (SE)

(73) Assignee: Seco Tools AB, Fagersta (SE)

( * ) Notice: Subject to any disclaimer, the term of this patent is extended or adjusted under 35 U.S.C. 154(b) by 103 days.

(21) Appl. No.: 11/307,562

(22) Filed: Feb. 13, 2006

(65) Prior Publication Data

US 2006/0228179 A1  Oct. 12, 2006

(30) Foreign Application Priority Data

Feb. 22, 2005  (SE) ................................ 0500414

(51) Int. Cl.
*B23B 27/16* (2006.01)

(52) U.S. Cl. ................ 407/113; 407/114; 407/115; 407/116

(58) Field of Classification Search ......... 407/113–116; *B23B 27/16*
See application file for complete search history.

(56) References Cited

U.S. PATENT DOCUMENTS

| | | | | |
|---|---|---|---|---|
| 5,032,049 A | * | 7/1991 | Hessman et al. ............ 407/113 |
| 5,222,843 A | * | 6/1993 | Katbi et al. ................. 407/114 |
| 5,634,745 A | * | 6/1997 | Wiman et al. ............... 407/113 |
| 5,904,450 A | * | 5/1999 | Satran et al. ................ 407/113 |
| 6,146,063 A | * | 11/2000 | Ramold et al. .............. 407/113 |
| 6,623,217 B2 | * | 9/2003 | Brockett et al. ............. 407/114 |
| 2004/0146365 A1 | * | 7/2004 | Usui et al. .................. 407/113 |

* cited by examiner

*Primary Examiner*—Boyer D. Ashley
*Assistant Examiner*—Sara Addisu
(74) *Attorney, Agent, or Firm*—WRB-IP LLP

(57) ABSTRACT

A metal cutting insert that is primarily intended for turning operations includes an upper surface, a lower surface substantially parallel with said upper surface, and at least three side surfaces extending between said upper and lower surfaces. A transition between two adjacent side surfaces forms a rounded nose radius surface at a cutting insert corner. The cutting insert includes a peripheral land bridging the upper and side surfaces at least at the corner portion at a chamfer angle. An intersection of the land and the nose radius surface forms a nose cutting edge. The nose cutting edge is defined by at least one radius. The cuffing corner includes at least one curved wiper edge. The chamfer angle in a cross-section at the nose cutting edge is larger than the chamfer angle in a cross-section a distance away from the nose cutting edge.

17 Claims, 6 Drawing Sheets

CUTTING INSERT

BACKGROUND AND SUMMARY

The present invention relates to a metal cutting insert that is primarily intended for turning operations.

For all sorts of turning operations, there is a certain interplay between the feed rate and the corner radius, the corner radius being the connection between the main cutting edge and the secondary cutting edge. The surface fineness produced on the workpiece is specifically influenced by the interplay between the corner radius and the feed rate. The approach angle is defined as the angle between the main cutting edge and the direction of feed. This angle has a considerable influence on the interrelation between the different cutting force components, and thereby also on the surface fineness and dimension accuracy. Surface fineness and dimension accuracy are very sensitive to changes of the approach angle. One problem for all turning operations is to obtain the desired surface fineness. Another problem is poor tool life.

Embodiments of prior cutting inserts are shown in EP 1226892 A2 and DE 10308234 A1.

It is desirable to provide a cutting insert that improves the fineness of the machined surface.

It is desirable to provide a cutting insert that significantly improves tool life.

Still another object of the present invention is to provide a cutting insert that improves surface finish over the total tool life.

It is desirable to provide a cutting insert that reduces influence on residual stresses in the work piece surface.

It is desirable to provide a cutting insert that reduces influence on hardness in the workpiece surface.

It is desirable to provide a cutting insert that reduces the sensitivity of a turning cutting insert relative to the positioned approach angle.

It is desirable to provide a cutting insert that reduces the radial forces during turning.

It is desirable to provide a cutting insert that reduces provides for a smaller variation in cutting edge position when used in a tool holder.

According to an aspect of the present invention, a cutting insert for turning comprises an upper surface, a lower surface substantially parallel with the upper surface, and at least three side surfaces extending between the upper and lower surfaces, a transition between two adjacent side surfaces forming a rounded nose radius surface at a cutting insert cutting corner. The cutting insert comprises a peripheral land bridging the upper and side surfaces at least at the cutting corner at a chamfer angle, and an intersection of the land and the nose radius surface forming a nose cutting edge, the nose cutting edge being defined by at least one radius. The cutting corner comprises at least one curved wiper edge. A chamfer angle in a cross-section at the nose cutting edge is larger than a chamfer angle in a cross-section a distance away from the nose cutting edge and the peripheral land in a plan view has a substantially constant width.

BRIEF DESCRIPTION OF THE DRAWINGS

The objects and advantages of the invention will become apparent from the following detailed description of preferred embodiments thereof in connection with the accompanying drawing in which like numerals designate like elements, and in which:

FIG. 3A shows a cross-section according to the line E in FIG. 1.

FIG. 3B shows a cross-section according to the line F in FIG. 1.

FIG. 3C shows a cross-section according to the line G in FIG. 1.

FIG. 3D shows a cross-section according to the line H in FIG. 1.

FIG. 3E shows a cross-section according to the line J in FIG. 1.

DETAILED DESCRIPTION

Figure 1:
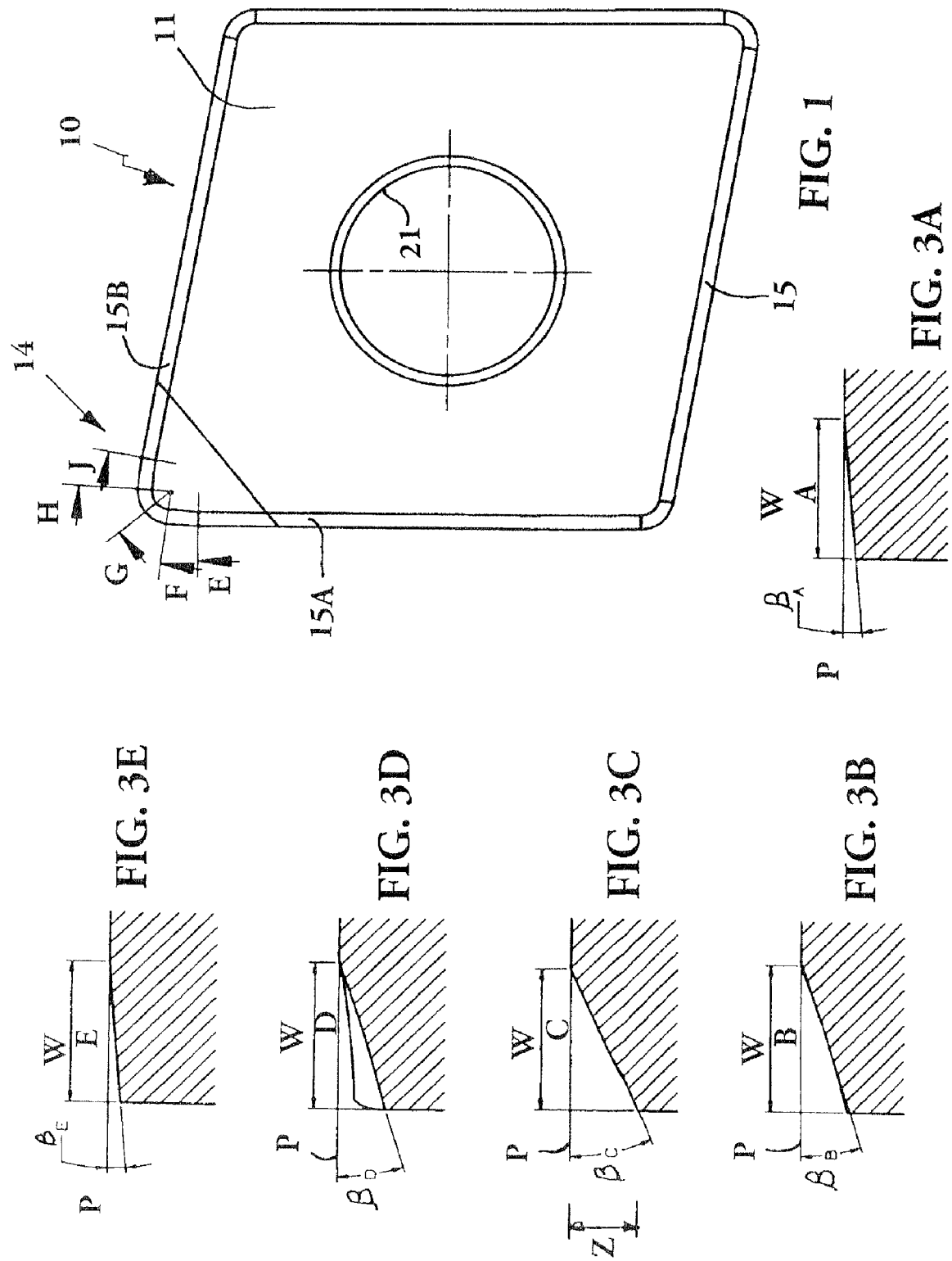
FIG. 1 shows a plan view of a turning cutting insert according to the invention.
Figure 2:
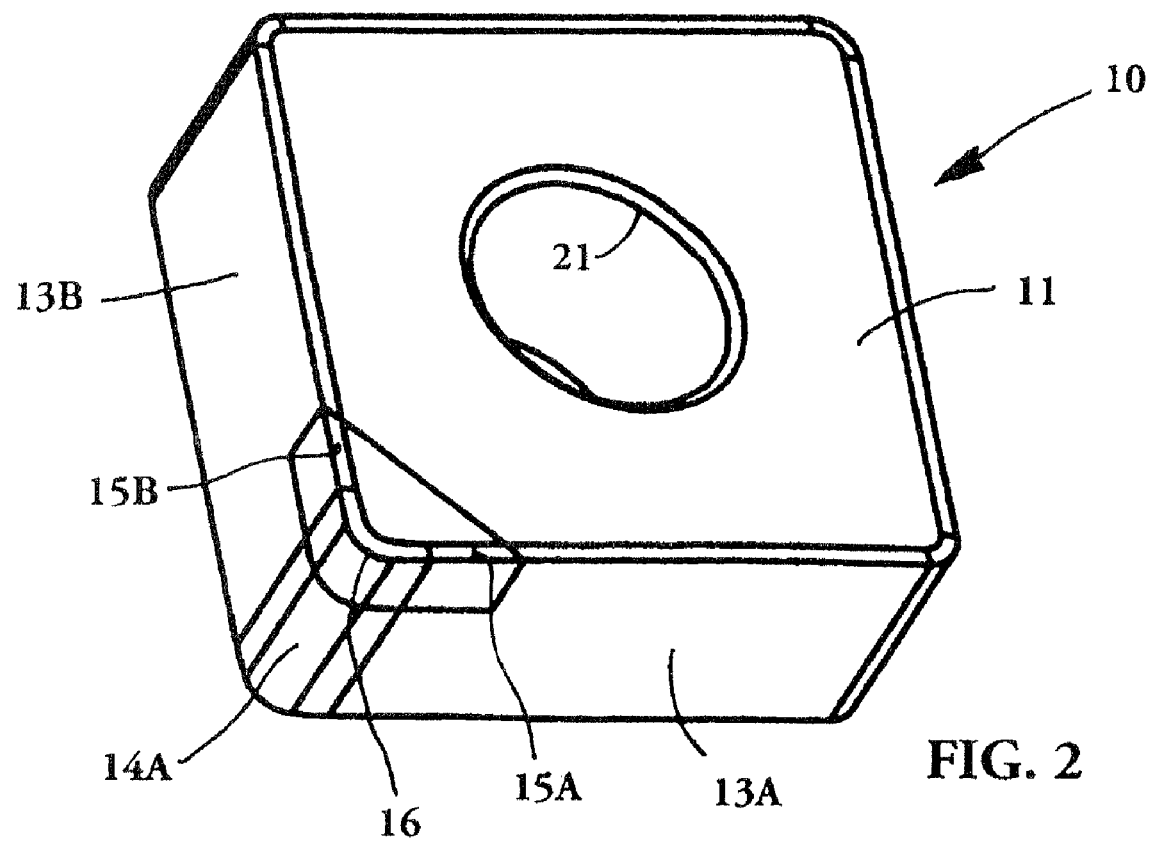
FIG. 2 shows the cutting insert in a perspective view.
Figure 4:
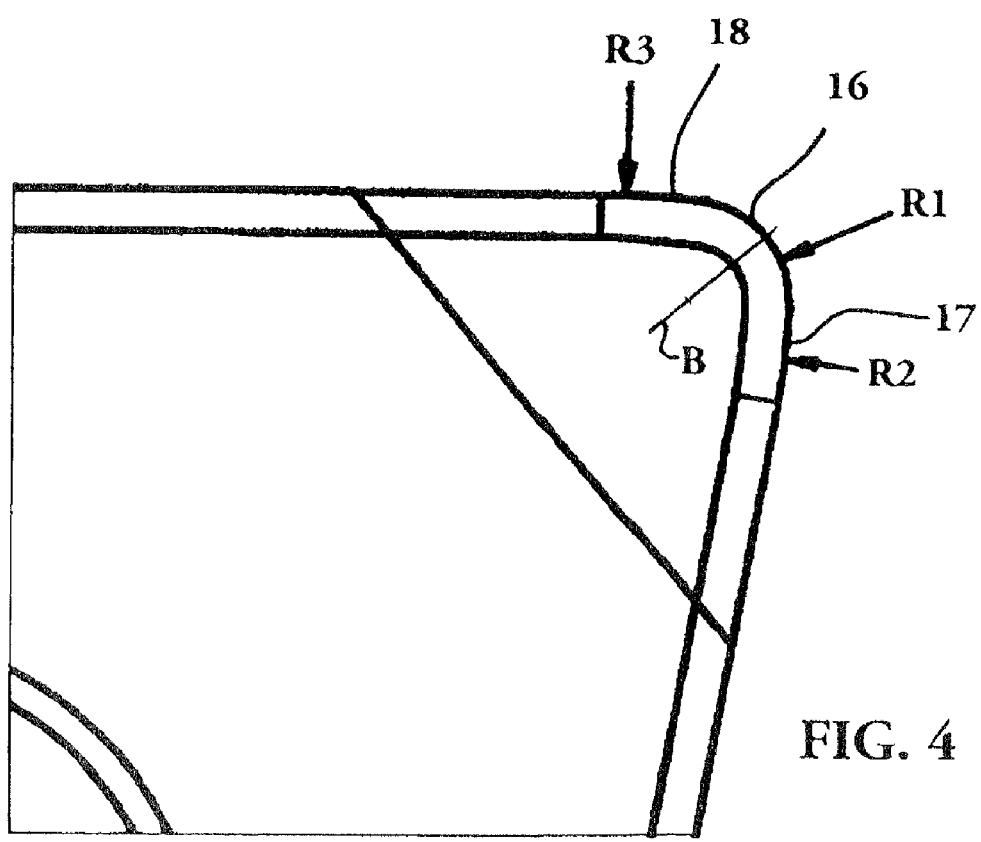
FIG. 4 shows a plan view of a corner portion of the cutting insert in magnification and in plan view.
Figure 5:
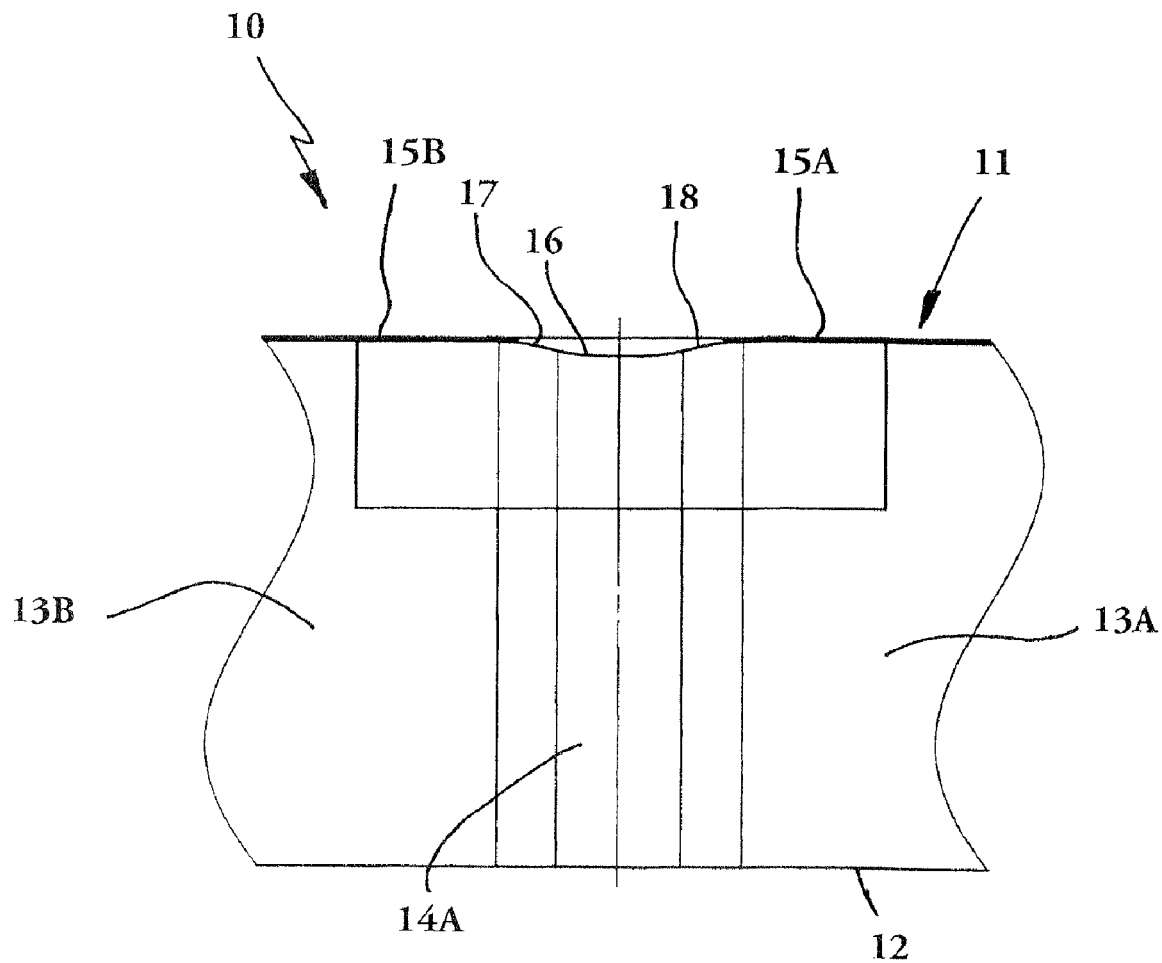
FIG. 5 shows the corner portion in a side view.
Figure 6A:
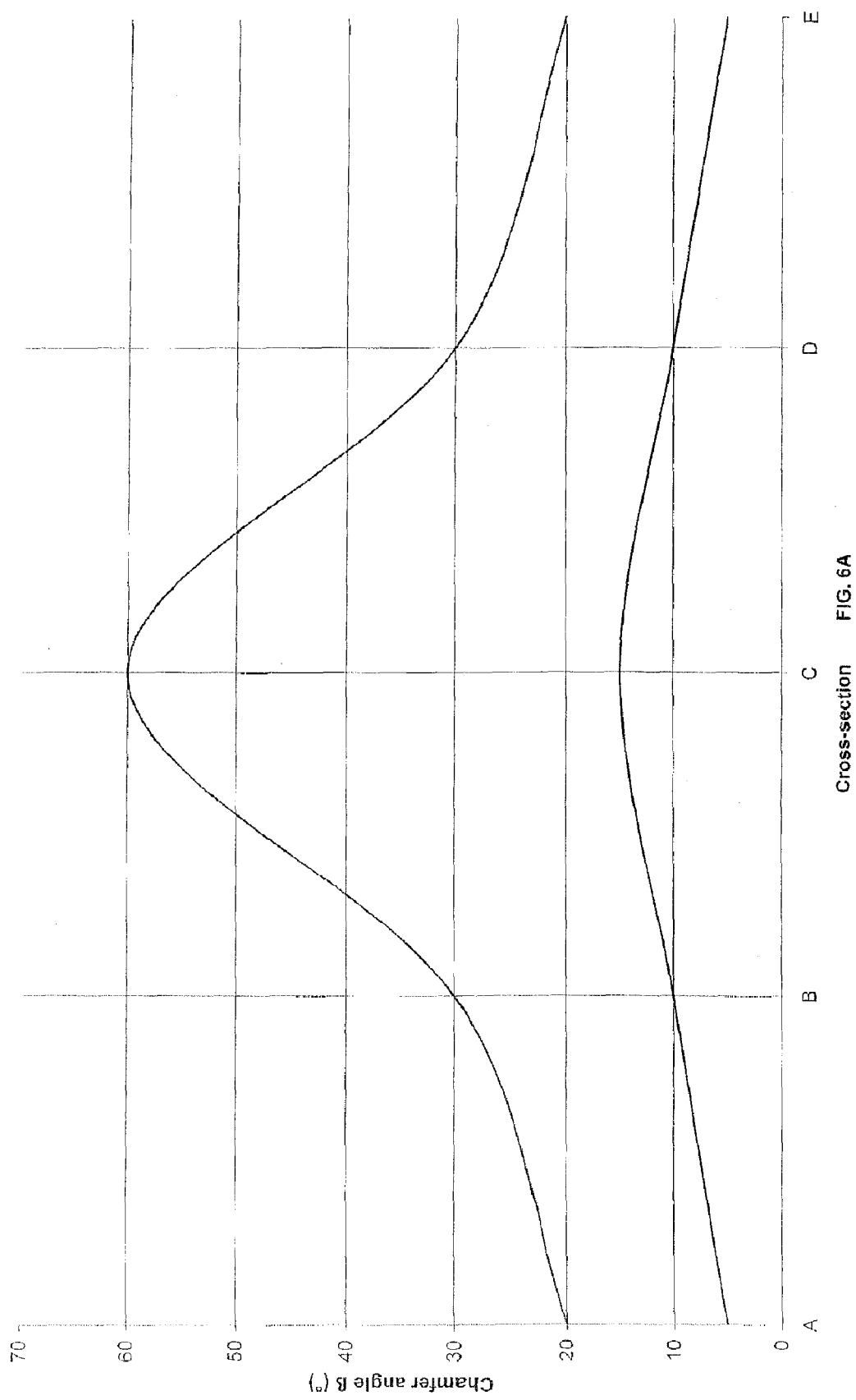
FIG. 6A shows a graph of chamfer angle range at the different cross-sections according to lines E-J in FIG. 1.
Figure 6B:
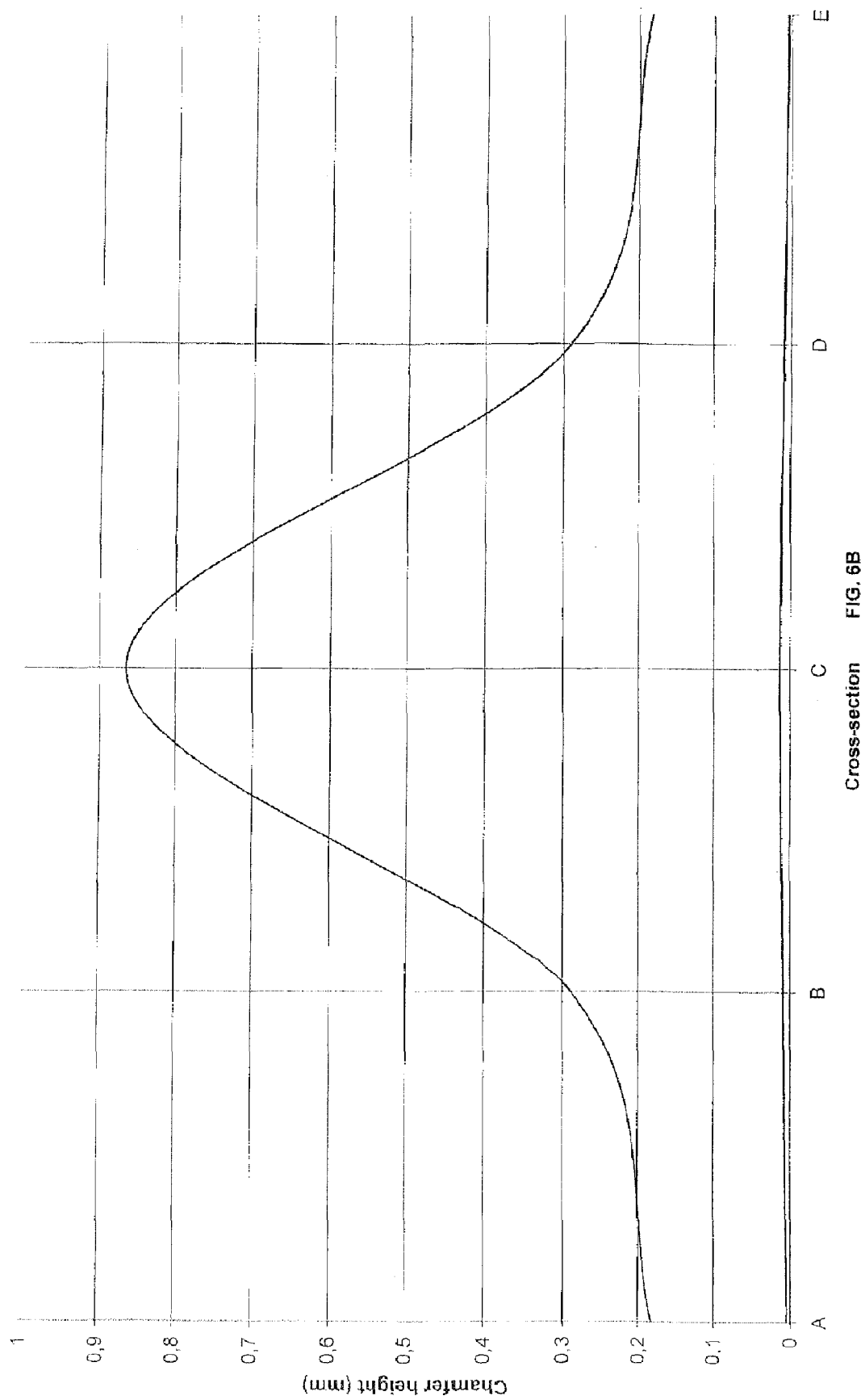
FIG. 6B shows a graph of chamfer height at the different cross-sections according to lines E-J in FIG. 1.

In FIGS. 1 to 5 a turning cutting insert 10 according to the present invention is shown. The cutting insert may be either single- or double-sided. The cutting insert is rhombic, the corner portion shown in FIG. 1 having a nose angle of about 60 to 80°. However, it may also be square, rectangular, triangular or hexagonal. When it is hexagonal, it may also be in the form of a so-called trigonal insert. The insert in this embodiment is made of cemented carbide having a cubic boron nitride (CBN) corner portion, but may also be made completely of any of those materials or of any other suitable material. The cutting insert 10 comprises an upper surface 11, a lower surface 12 substantially parallel with said upper surface, and at least three side surfaces 13A,13B extending between said upper and lower surfaces. The upper surface 11 is planar in this embodiment and extends perpendicularly relative to said at least three side surfaces. A transition between two adjacent side surfaces 13A,13B forms a rounded nose radius surface 14A at a cutting insert corner 14.

The cutting insert 10 comprises a peripheral land 15, constituted by at least two peripheral lands 15A and 15B, bridging the upper and side surfaces at least at the corner portion 14. The peripheral lands 15A and 15B in this embodiment encircles the entire cutting insert periphery. The peripheral lands 15A and 15B in this embodiment are of different configuration. The peripheral lands 15A and 15B slope at chamfer angles βA-βE (as illustrated by FIGS. 3A-3E) relative to a plane P containing the upper surface 11. The peripheral land is adapted to strengthen the cutting edges of the cutting insert. In this embodiment the upper surface 11 is planar and connects directly to the peripheral land 15 to allow a strong configuration. An intersection of the peripheral land 15 and the nose radius surface 14A forms a nose cutting edge 16. The nose cutting edge 16 is defined by at least one radius R1. Each operative cutting corner 14 comprises at least one convex wiper edge 17, 18 connected to the nose cutting edge 16. In this embodiment there is provided a first 17 and a second 18 wiper edge separated by the nose cutting edge 16. The nose radius surface 14A may be symmetrical with respect to the corner bisector B. This results in the advantage that the cutting insert becomes symmetrical, thereby enabling both left-hand and right-hand turning with the same insert, i.e., both left-hand and right-hand holders may be used for this cutting insert. The cutting insert 10 in this embodiment has a through-going hole 21 extending perpendicularly to the surfaces 11 and 12.

Referring especially to FIG. 3C and for example 3E, the chamfer angle βC in a cross-section at the nose cutting edge 16 is larger than the chamfer angle βE in a cross-section a distance away from the nose cutting edge 16. The chamfer angle βC in the cross-section at the nose cutting edge 16 is larger than the chamfer angle in a cross-section at said first 17 or second 18 wiper edge. The peripheral land 15A and 15B follows a substantially straight line in a cross-section through the cutting insert 10, such as shown in FIGS. 3A-3E. The peripheral land 15 has a continuously varying chamfer angle β at the corner portion 14. The chamfer angle βC, in a cross-section as illustrated by FIG. 3C at the nose cutting edge 16, is larger than the chamfer angle βE in a cross-section at the first wiper edge 17. The peripheral land 15 in a plan view has a substantially constant width WA-WE, as illustrated by FIGS. 3A-3E. The land width WE is however slightly larger than the widths WA-WD. Alternatively, the land widths may vary similar to the variations of the chamfer angle.

The first wiper edge 17 is defined by at least one first wiper radius R2 and the second wiper edge 18 is defined by at least one second wiper radius R3, said radii R1-R3 have different points of origin. The radii R2 and R3 can be equally large. The peripheral land 15 at each first and second wiper edge 17, 18 has a continuously varying chamfer angle β. Referring to FIGS. 3A-3E and FIGS. 6A and 6B, the angle βA is chosen within the range 5 to 20°; the angle βB is chosen within the range 10 to 30°; the angle βC is chosen within the range 15 to 60°; the angle βD is chosen within the range 10 to 30°, and the angle βE is chosen within the range 5 to 20°. Furthermore, the projected height Z of the chamfer when viewed perpendicular to the side surface 13A, 13B or nose radius surface 14A may vary in the range disclosed in FIG. 6B or as follows (in mm):

| A | B | C | D | E |
|---|---|---|---|---|
| 0.004 | 0.009 | 0.01 | 0.009 | 0.004 |
| 0.18 | 0.29 | 0.86 | 0.29 | 0.18 |

Figure 7A:
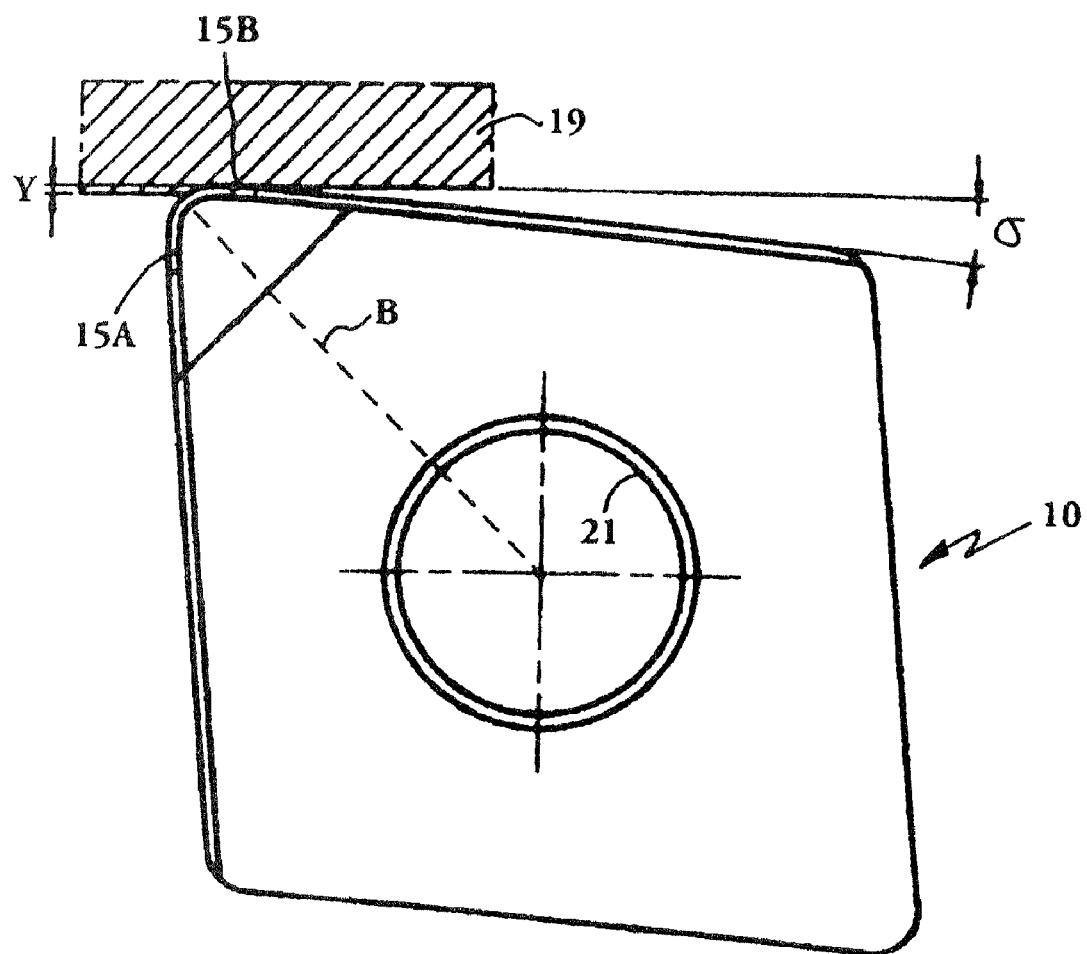
FIG. 7A shows the cutting insert during turning of a work piece and FIG. 7B shows portions of the cutting insert and the workpiece.
Figure 7B:
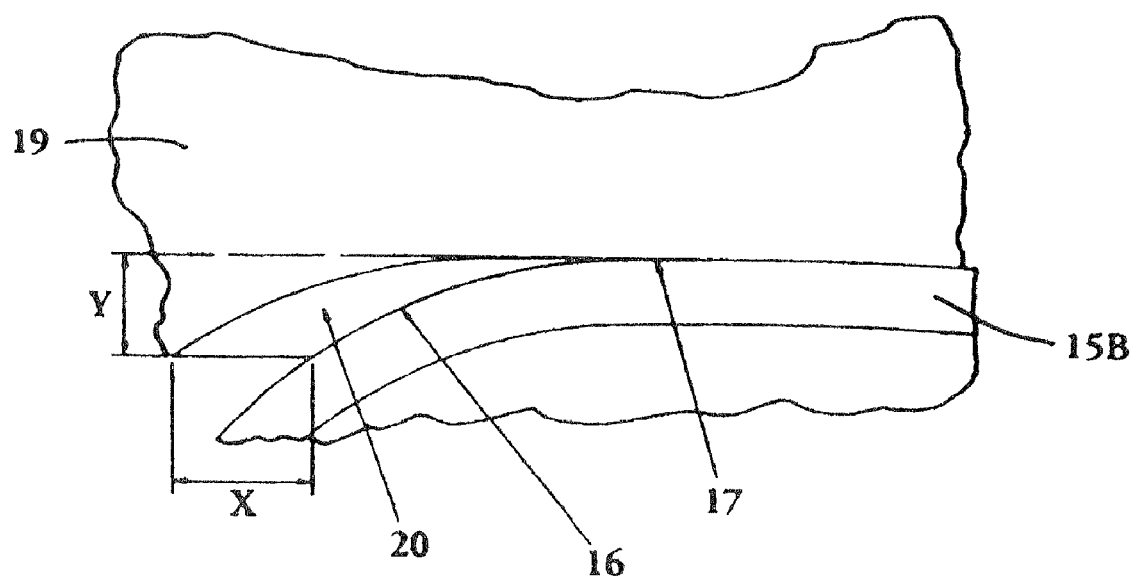

Referring now to FIGS. 7A and 7B that show the cutting insert during turning of a work piece 19 and an enlarged portion of the cutting insert and the workpiece during a hard turning process, respectively. Usually the depth of cut Y is equal to or less than the nose cutting edge radius R1, such that the uncut material for example does not reach the bisector B. The insert is positioned with a clearance angle σ beyond the wiper edge 17. The size of the chip 20 to be removed is determined by the depth of cut Y and the feed per revolution X. The thickness of the chip transfers into zero at the convex wiper edge 17. Since the peripheral land 15 has a chamfer that is most blunt at the bisector of the corner portion 14 that portion withstands wear while the wiper edge 17 that cuts the thin part of the chip is relatively sharp a good surface fineness is obtained. The fact that that the peripheral land 15, 15A, 15B in a plan view has a substantially constant width WA-WE provides for a smaller variation in cutting edge position when used in a tool holder.

In the described embodiment the active corner of the cutting insert is a section of CBN and thus the cutting edges 16, 17 and 18 are comprised of CBN. Alternatively any other suitable cutting material can be used all due the machining application.

When using cutting inserts having wiper edges the radial forces become high compared to conventional cutting inserts without wiper edges. A cutting insert according to the present invention has a more blunt chamfer angle about the bisector of its cutting corner to protect the corner from breakage during high feeds while the wiper edge has a less blunt to diminish the radial forces. Thus, a cutting insert for turning is proposed that improves the fineness of the machined surface and significantly improves tool life.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A cutting insert for turning comprising an upper surface, a lower surface substantially parallel with the upper surface, and at least three side surfaces extending between the upper and lower surfaces, a transition between two adjacent side surfaces forming a rounded nose radius surface at a cutting insert cutting corner, the cutting insert comprising a peripheral land bridging the upper and side surfaces at least at the cutting corner at a chamfer angle, and an intersection of the land and the nose radius surface forming a nose cutting edge, the nose cutting edge being defined by at least one radius, the cutting corner comprising at least one curved wiper edge, wherein a chamfer angle in a cross-section at the nose cutting edge is larger than a chamfer angle in a cross-section a distance away from the nose cutting edge and the peripheral land in a plan view has a substantially constant width.

2. The cutting insert according to claim 1, wherein the peripheral land is provided as a chamfer encircling the entire cutting insert periphery.

3. The cutting insert according to claim 1, wherein the peripheral land follows a substantially straight line in a cross-section through the cutting insert.

4. The cutting insert according to claim 1, wherein the peripheral land has a continuously varying chamfer angle at the cutting corner.

5. The cutting insert according to claim 4, wherein the chamfer angle in a cross-section at the nose cutting edge is larger than a chamfer angle in a cross-section at a first wiper edge.

6. The cutting insert according to claim 1, wherein the cutting corner comprises a first wiper edge being defined by at least one radius and a second wiper edge being defined by at least one radius, the radii have different points of origin.

7. The cutting insert according to claim 6, wherein each first and second wiper edge has a continuously varying chamfer angle.

8. The cutting insert according to claim 1, wherein the chamfer angle in the cross-section at the nose cutting edge is larger than a chamfer angle in a cross-section at the wiper edge.

9. The cutting insert according to claim 8, wherein the peripheral land is provided as a chamfer encircling the entire cutting insert periphery.

10. The cutting insert according to claim 8, wherein the peripheral land follows a substantially straight line in a cross-section through the cutting insert.

11. The cutting insert according to claim 8, wherein the peripheral land has a continuously varying chamfer angle at the cutting corner.

12. The cutting insert according to claim 11, wherein the chamfer angle in a cross-section at the nose cutting edge is larger than a chamfer angle in a cross-section at a first wiper edge.

13. The cutting insert according to claim 8, wherein the cutting corner comprises a first wiper edge being defined by at least one radius and a second wiper edge being defined by at least one radius, the radii have different points of origin.

14. The cutting insert according to claim 13, wherein each first and second wiper edge has a continuously varying chamfer angle.

15. The cutting insert according to claim 1, wherein the cutting insert comprises cubic boron nitride.

16. The cutting insert according to claim 1, wherein the cutting insert consists essentially of cubic boron nitride.

17. The cutting insert according to claim 1, wherein the peripheral land extends downwardly from the upper surface to the side surface.

* * * * *